United States Patent
Fujiwara et al.

[11] Patent Number: 5,823,522
[45] Date of Patent: Oct. 20, 1998

[54] SHEET HOLDER REMOVABLY ATTACHED TO DATA PROCESSING APPARATUS

[75] Inventors: Tatsuo Fujiwara; Hiroyuki Maruyama; Toshio Saitoh, all of Kawasaki, Japan

[73] Assignee: Fujitsu Limited, Kanagawa, Japan

[21] Appl. No.: 689,729

[22] Filed: Aug. 13, 1996

[30] Foreign Application Priority Data

Aug. 28, 1995 [JP] Japan ................................. 7-218669

[51] Int. Cl.⁶ .................................................. B65H 5/22
[52] U.S. Cl. ........................ 271/4.08; 271/145; 271/162; 271/171; 271/164
[58] Field of Search .................... 271/4.08, 4.1, 271/145, 162, 164, 171

[56] References Cited

U.S. PATENT DOCUMENTS

| 4,303,235 | 12/1981 | Calabrese | 271/162 |
| 5,054,759 | 10/1991 | Lohrmann et al. | 400/624 |
| 5,106,074 | 4/1992 | Nishigaki et al. | 271/162 |
| 5,263,702 | 11/1993 | Labua | 271/171 |
| 5,277,418 | 1/1994 | Jones et al. | 271/145 |
| 5,346,197 | 9/1994 | Takano et al. | 271/171 |
| 5,599,120 | 2/1997 | Conrad et al. | 271/145 |

FOREIGN PATENT DOCUMENTS

| 0 621 719 A1 | 10/1994 | European Pat. Off. . | |
| 28 16 448 A1 | 10/1979 | Germany . | |
| 0259931 | 11/1987 | Japan | 271/145 |

Primary Examiner—H. Grant Skaggs
Attorney, Agent, or Firm—Armstrong, Westerman, Hattorie, McLeland & Naughton

[57] ABSTRACT

A sheet holder removably attached to a hopper of a image reading apparatus. The sheet holder has a front bottom wall, a rear top wall, and an intermediate wall connecting the front bottom wall to the rear top wall. The front bottom wall provides a sheet placing area onto which small and thick sheets like business cards are placed and a holding member holds the sheets on the sheet placing area. A pick roller of the image reading apparatus can contact the sheet on the sheet placing area when the sheet holder is attached to the apparatus. The apparatus has a box-shaped a casing having a drawable hopper table providing a hopper for placing normal thin sheets thereon.

20 Claims, 12 Drawing Sheets

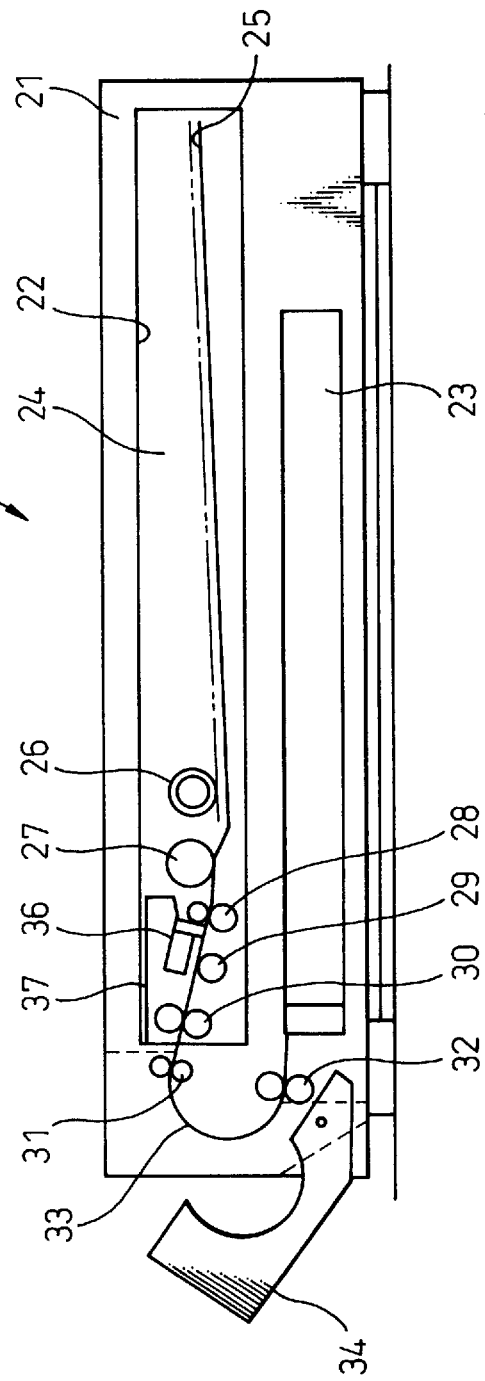

SHEET HOLDER REMOVABLY ATTACHED TO DATA PROCESSING APPARATUS

BACKGROUND OF THE INVENTION

1. Field of the Invention

The present invention relates to a sheet holder removably attached to a data processing apparatus such as an image reading apparatus. In particular, the present invention relates to a sheet holder adapted to place small and thick sheets thereon so that information on the sheets can be read by the image reading apparatus.

2. Prior Art

Recently, electronic data processing systems have been developed in which an image reading apparatus (image scanner) is connected to a personal computer or an electronic notebook to read a variety of documents including business cards and to convert the read information into letter codes, by optical character recognition to provide a data base. When the business cards are read in such a system, an image reading apparatus having an appropriate size matched to a size of the business cards is used. In addition, since a high density recording in recording mediums such as optomagnetic disks (MO) or hard disks (HDD) has been developed, electronic filing systems in which information read by the image reading apparatus is stored as image data are widely used.

There are requirements to reduce written business documents in the office to reduce the space necessary for preserving the documents. Business documents are typically filed in such a filing system to satisfy the requirement to reduce the space. The sheets usually used for business documents are of A4-size, A3-size, B4-size, and a legal size. These sheets are relatively thin. For example, the usual business sheets have the weight of 55 to 90 kilogram per unit. The conventional image reading apparatus used in the electronic filing system is designed to handle these standard sheets.

The image reading apparatus includes a hopper for placing sheets thereon, a conveying path for conveying the sheets, a stacker for discharging the sheets, and a reading head (image sensor) for reading information on the sheets. A pick roller is arranged on the hopper for picking up the sheets one by one and a separator roller is arranged to separate the sheets if a plurality of sheets are simultaneously picked up. The apparatus includes other conveying rollers.

The conventional image reading apparatus is particularly designed to convey and read business documents of standard sheets. However, business cards are smaller than the sheets used for business documents, and typically have the size of 55×90 millimeter. Also, sheets for the business cards are usually thick. For example, the weight thereof is more than 160 kilogram per unit. Thus the thickness of the business cards is considerably greater than that of the standard sheets used for business documents.

In conveying the thick business card through the conveying path of the image reading apparatus, the conveying path should be as straight as possible because a conveying resistance becomes larger if the business cards are bent. On contrast, the business document can be bent freely and no problem occurs even if the conveying path is bent, so the conveying path is not necessarily straight. Therefore, to satisfy a need to save a space in the office, the conveying paths of some image reading apparatuses are bent so that the overall size of the apparatus can be made compact. However, it is difficult to read the small and thick business cards in these image reading apparatuses.

In addition, the hopper is designed to adapt to relatively large documents, so there is a possibility of problem that, if small and thick sheets such as business cards are conveyed in the apparatus, the sheet may be skewed or the sheets may not be easily fed from the pick roller to the separator roller since the conveying passage defined by the depth of the hopper and the thickness of the sheets are not matched.

In addition, the pick roller should properly contact the upper surface of the sheet in order to normally feed and convey the sheet, but in the image reading apparatus having the sheet feeding mechanism incorporated therein, it is difficult to place the small business cards at an appropriate position on the hopper so that the pick roller properly contacts the upper surface of the sheet. Therefore, it is difficult to feed the small business cards without problem.

EP-A1-0621719, filed by the same assignee as for the present case, discloses a data processing apparatus having a box-shaped casing having parallel and horizontal cavities and a hopper table arranged in the upper cavity. The hopper table has a hopper onto which a plurality of sheets can be set and a reading head (image sensor), and the lower cavity of the casing serves as a stacker. Sheet conveying rollers are arranged for conveying the documents from the hopper through the reading head to the stacker. A plurality of documents can be handled at a time, and yet, the hopper and the stacker do not project from the casing. Therefore, this apparatus is advantageous in placing it in a small area available. The above described problems occur in this data processing apparatus too.

SUMMARY OF THE INVENTION

The object of the present invention is to provide a sheet holder which can be removably attached to a data processing apparatus and by which small and/or thick sheets such as business cards can be properly placed on a hopper of the data processing apparatus when attached.

According to the present invention, there is provided a sheet holder for use with a data processing apparatus having a hopper and a pick roller, the sheet holder being adapted to be removably attached to the hopper of the data processing apparatus. The sheet holder comprises a body having a wall portion forming a sheet placing area arranged such that at least one sheet can be placed on the sheet placing area and the pick roller can contact the sheet on the sheet placing area when the sheet holder is attached to the hopper, and securing means for cooperation with complementary securing means arranged in the hopper for fixing the sheet holder to the hopper.

By this hopper, it is possible to place such sheets that may not be directly placed on a hopper of the data processing apparatus on a hopper of the data processing apparatus, to thereby read business cards, for example.

Preferably, the sheet holder further comprises a holding member for holding the sheet on the sheet placing area, the holding member having one end and an opposite end, the holding member being pivotable about a pivot arranged between the one end and the opposite end so that the one end is manually operable and the opposite end can contact the sheet on the sheet placing area. Therefore, it is possible to easily attach the sheet holder to the data processing apparatus with the sheets reliably held in the sheet holder.

Preferably, the body of the sheet holder comprises a front bottom wall, a rear top wall, and an intermediate wall connecting the front bottom wall to the rear top wall with a step between the front bottom wall and the rear top wall. The holding member passes through the intermediate wall so that the one end is arranged below the rear top wall and the opposite end is arranged above the front bottom wall. A portion of the holding member from the one end to the pivot is heavier than a portion of the holding member from the other end to the pivot.

Preferably, in the case where the data processing apparatus has side guides arranged on the hopper for transverse movement on the hopper to guide the sheet placed on the hopper, the securing means comprises an securing member for engagement with a complementary securing member provided in the side guide and a guide having a pair of panels for sandwiching a complementary panel of the side guide, the complementary securing means comprising the complementary securing member and the complementary panel.

Preferably, the wall portion forming the sheet placing area has a surface and the hopper has a surface, the surface of the sheet placing area being higher than the surface of the hopper.

The present invention also provides a data processing apparatus including the sheet holder having the above described feature.

In one aspect of the invention, the data processing apparatus comprises: a hopper; a pick roller for feeding a sheet placed on the hopper; side guides arranged on the hopper for transverse movement on the hopper to guide the sheet placed on the hopper; a first member removably attached to the hopper; a first securing means arranged in the first member; and a second securing means arranged in at least one of the side guides for engaging with the first securing means to removably fix the first member to the hopper.

In another aspect of the invention, the data processing apparatus comprises: a casing having a first cavity and a second cavity arranged in a vertically spaced relationship; a hopper table drawably arranged in the first cavity, the hopper table having a hopper for placing sheets thereon; the second cavity being a stacker; data processing means arranged in the hopper table; a pick roller for feeding a sheet on the hopper; a separator roller attached to a separator roller shaft; side guides arranged on the hopper for transverse movement on the hopper to guide the sheet placed on the hopper; a sheet holder removably attached to the hopper, the sheet holder comprising a body having a wall portion forming a sheet placing area arranged such that at least one sheet can be placed on the sheet placing area and the pick roller can contact the sheet on the sheet placing area when the sheet holder is attached to the hopper, and a holding member for holding the sheet on the sheet placing area, the holding member having one end and an opposite end, the holding member being pivotable about a pivot arranged between the one end and the opposite end so that the one end is manually operable and the opposite end can contact the sheet on the sheet placing area; a first securing means arranged in the sheet holder; and a second securing arranged arranged in at least one of the side guides for engaging with the first securing means to removably fix the sheet holder to the hopper.

BRIEF DESCRIPTION OF THE DRAWINGS

The other objects and features of the present invention will become more apparent from the following description of the preferred embodiments, with reference to the accompanying drawings, in which:

FIG. 5A is a diagrammatic cross-sectional view of the image reading apparatus to which the sheet holder of FIGS. 1 to 4B are attached;

DESCRIPTION OF THE PREFERRED EMBODIMENTS

Figure 1:
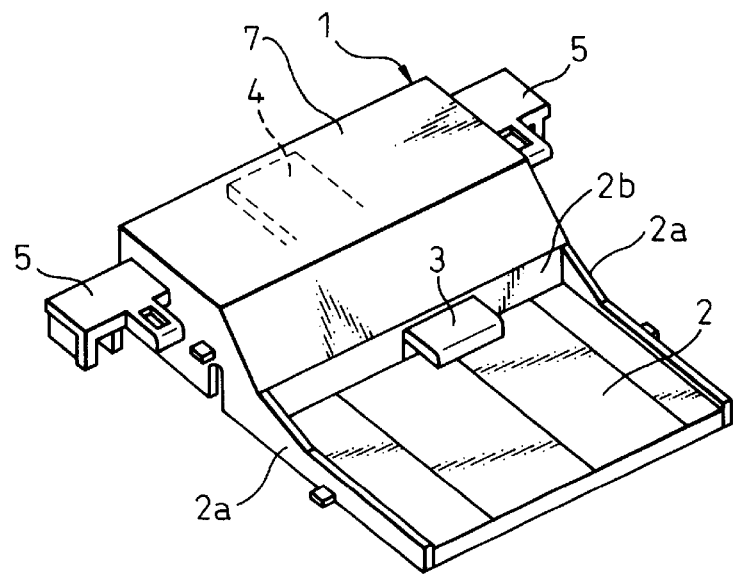
FIG. 1 is a perspective view of the sheet holder according to the embodiment of the present invention.

FIG. 1 is a perspective view of the sheet holder according to the embodiment of the present invention, for use with the image reading apparatus of FIGS. 5A to 13, for example. The sheet holder is particularly adapted for holding small and/or thick sheets such as business cards or the like thereon and is removably attached to the hopper of the image reading apparatus. Accordingly, its shape is relatively small. The description is now made with reference to the sheet holder for holding business cards.

In FIG. 1, the sheet holder has a holder body 1 having a sheet placing portion 2 on which sheets are to be placed.

The sheet placing portion 2 is a bottom wall of the holder body 1 having an adequate thickness and delimited by side walls 2a and a rear wall 2b. The upper side of the sheet placing portion 2 is open, so a pick roller of the image reading apparatus is located above the sheet placing portion 2 when the sheet holder is attached to the image reading apparatus, whereby the pick roller can contact the business card placed on the sheet holder to feed the sheets. The holder body 1 also has a rear top wall 7 on the rear side of the sheet placing portion 2, with a step between the sheet placing portion 2 and the rear top wall 7.

The sheet holder includes a clip 3 which is movable up and down to hold the business cards placed on the sheet placing portion 2. A lever 4 is formed integrally with the clip 3 at the rear thereof, so that the clip 3 moves with the manual operation of the lever 4. The sheet holder also includes securing portions 5 which are used when the sheet holder is attached to the image reading apparatus. The securing portions 5 are arranged on either lateral side of the sheet holder in this embodiment. It is possible to arrange one securing portion on one side of the sheet holder or to arrange the securing portion(s) at a different position from the illustrated one, according to a particular arrangement of the image reading apparatus to which the sheet hopper is attached. The details of the attachment of the sheet holder to the hopper of the image reading apparatus is described later.

Figure 2:
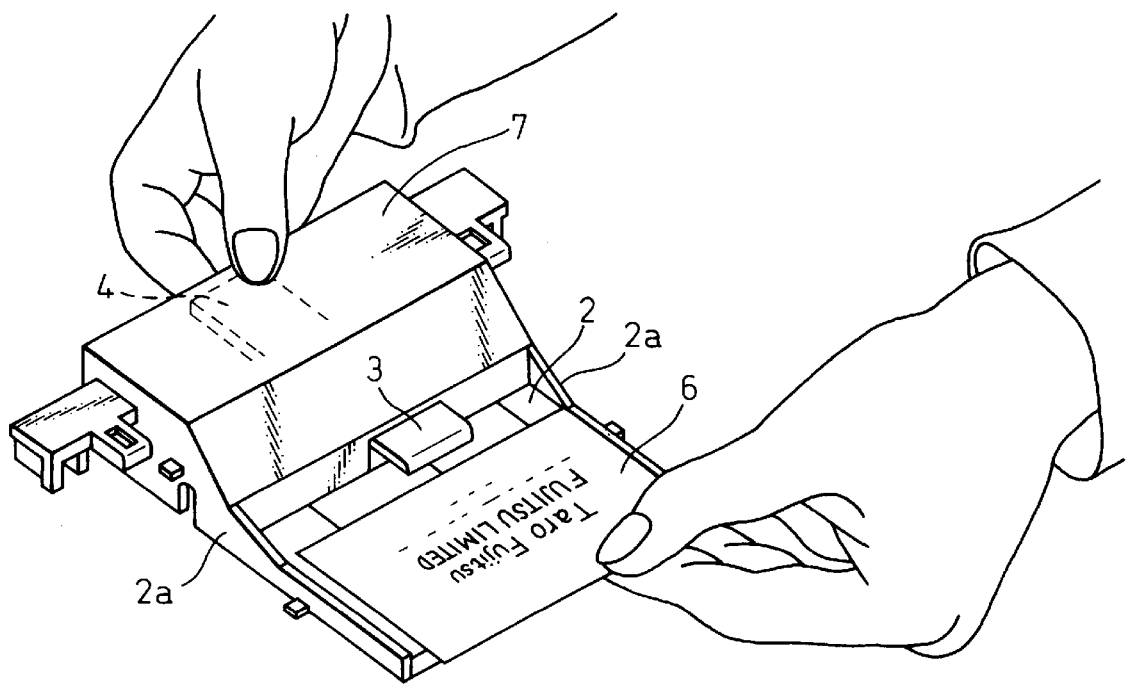
FIG. 2 is a perspective view of the sheet holder of FIG. 1 with the business cards placed thereon.

FIG. 2 shows the sheet holder of FIG. 1 with the business cards 6 placed thereon. The business cards 6 are placed on the sheet placing portion 2 such that their longitudinal sides extend transversely in the sheet holder. In this position, the sides of the business cards 6 are guided by the side walls 2a. The rear ends of the business cards 6 are brought into abutment against the rear wall 2b to thereby arrange the front ends of the business cards 6 in order.

When the business cards 6 are placed on the sheet holder, the lever 4 and the rear top wall 7 are grasped together to move the lever 4 toward the rear top wall 7, so that the clip 3 is moved down to hold the business cards 6. Therefore, the business cards 6 are held in the sheet placing portion 2, and therefore, the business cards 6 may not drop off the sheet placing portion 2 when the sheet holder with the business cards 6 is attached to the image reading apparatus.

Figure 3A:
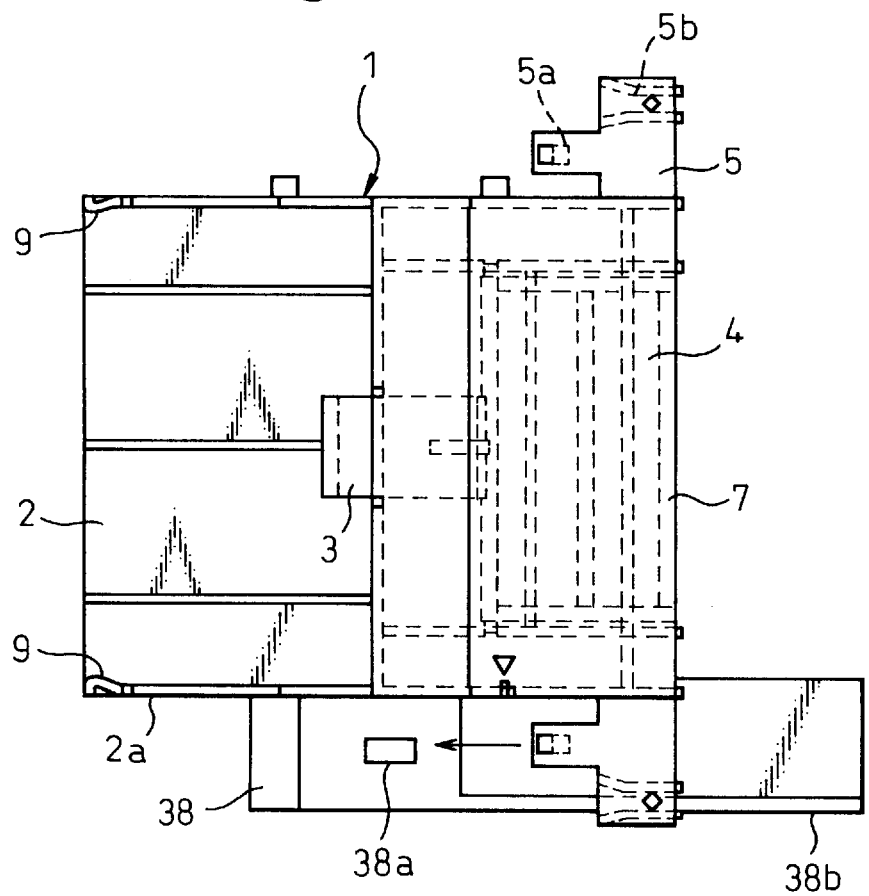
FIG. 3A is a plan view of the sheet holder of FIG. 1 and a portion of the side guide of the image reading apparatus.
Figure 3B:
FIG. 3B is a side view of the sheet holder of FIG. 3A.

FIGS. 3A and 3B show the details of the securing portions 5 of the sheet holder. A portion of the side guide of the image reading apparatus is also shown in FIGS. 3A and 3B. The securing portions 5 are arranged on the lateral sides of the rear top wall 7, and each comprises a horizontally extending panel, a securing finger 5a protruding downward from the horizontal panel, and a guide 5b. The guide 5b comprises a pair of downward extending panels with a gap formed therebetween.

The image reading apparatus has a complementary securing means with which the securing portion 5 of the sheet holder is engaged. The complementary securing means of the image reading apparatus comprises side guides 38 (only one is shown in FIG. 3A), which can be transversely moved to guide the sheets placed on the hopper of the image reading apparatus when the sheet holder is not used. Each of the side guides 38 includes a securing hole 38a and an upwardly extending guide panel 38b on the lateral edge of the side guide 38. When the sheet holder is attached to the image reading apparatus, the sheet holder is moved along the side guide 38 in the direction of the arrow in FIG. 3A, so that two panels of each guide 5b of the sheet holder are fitted on or sandwich the guide panel 38b of the image reading apparatus. The guide holder is thus guided along the guide panel 38b until the securing finger 5a of the sheet holder is engaged in the securing hole 38a of the image reading apparatus to fix the sheet holder to the image reading apparatus. Therefore, the sheet holder is reliably fixed to the image reading apparatus. The leading ends of the two panels of the guide 5b of the sheet holder are divergently shaped to facilitate the insertion of the guide 5b into the guide panel 38b.

Small stoppers 9 are arranged at the front ends of the side walls 2a on the sheet placing portion 2 so as to temporarily stop the front ends of the business cards 6 when the clip 3 is released.

Figure 4A:
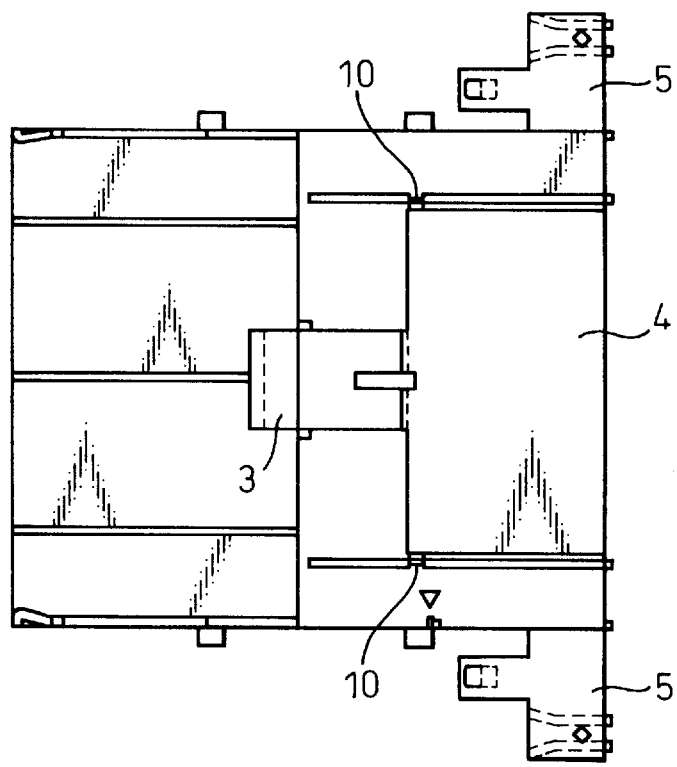
FIG. 4A is a plan view of the sheet holder with the rear top wall thereof being removed to illustrate the clip and the lever.
Figure 4B:
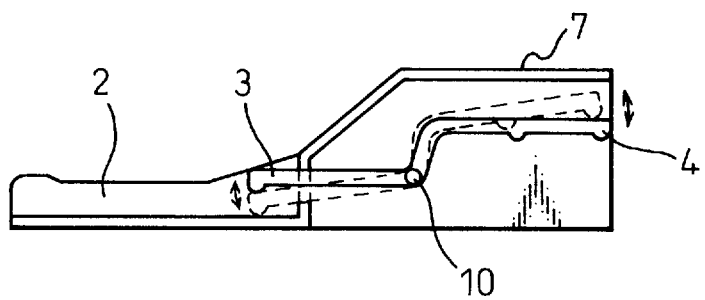
FIG. 4B is a side view of the sheet holder of FIG. 4A.

FIGS. 4A and 4B show the details of the clip 3 and the lever 4 integrally formed with the clip 3. The lever 4 is located below the rear top wall 7, and the clip 3 is located above the sheet placing portion 2. The clip 3 with the lever 4 is pivotally supported at a mid point thereof by pivots 10. The clip 3 can be moved up and down in the directions shown by the arrows in FIG. 4B by moving the lever 4. The solid line in FIG. 4B shows the clip 3 in the upper position, and the broken line shows it in the lower position. Accordingly, when the lever 4 and the rear top wall 7 are grasped together to move the lever 4 toward the rear top wall 7, the clip 3 is moved down to hold the business cards 6 in the sheet placing portion 2. When the lever 4 is released, the lever 4 and the clip 3 move to the position of the solid line, since a portion of the lever 4 is heavier than a portion of the clip 3.

Figure 5B:
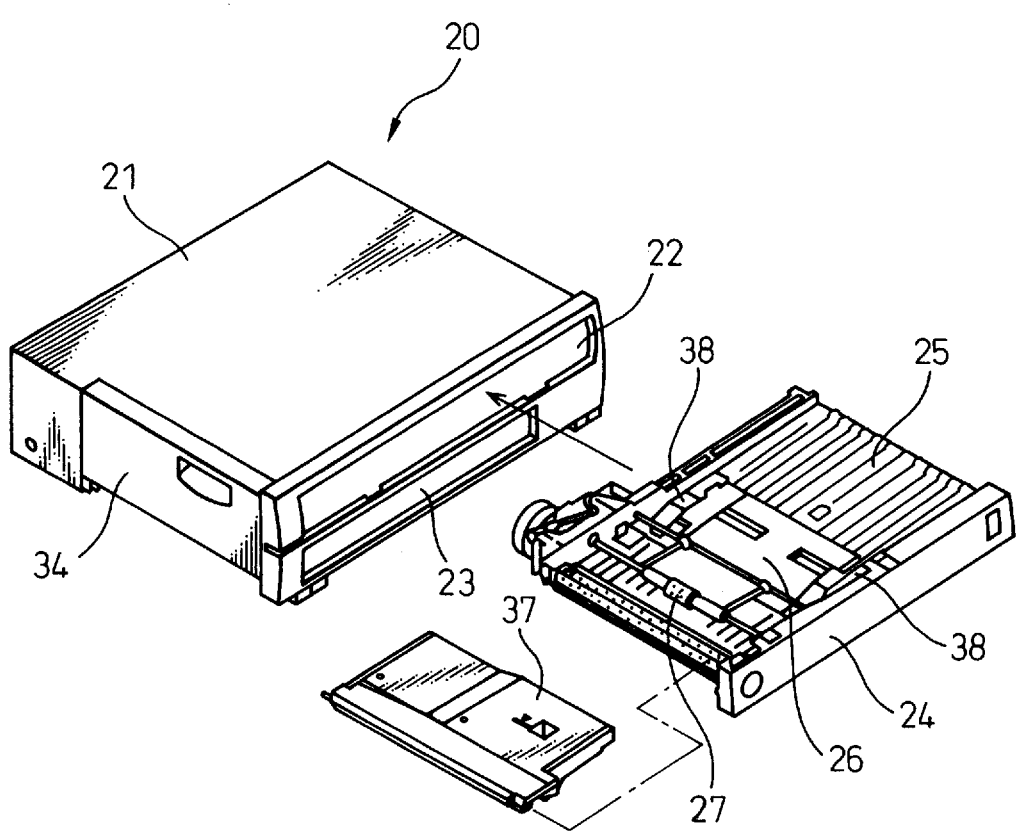
FIG. 5B is an exploded perspective view of the image reading apparatus of FIG. 5A.

FIGS. 5A and 5B show the image reading apparatus to which the sheet holder of FIGS. 1 to 4B are attached. The image reading apparatus 20 has a rigid box-shaped casing 21 which has two wide cavities 22 and 23 in the front of the casing 21 in a vertically spaced relationship. The apparatus includes a front loading type hopper table 24 drawably inserted in the upper cavity 22. The hopper table 24 provides a hopper 25 on which sheets or documents to be read can be set, if the sheet holder is not used. The hopper table 24 can be pushed into the closed position in the casing 21, and can be pulled forwardly.

Figure 13:
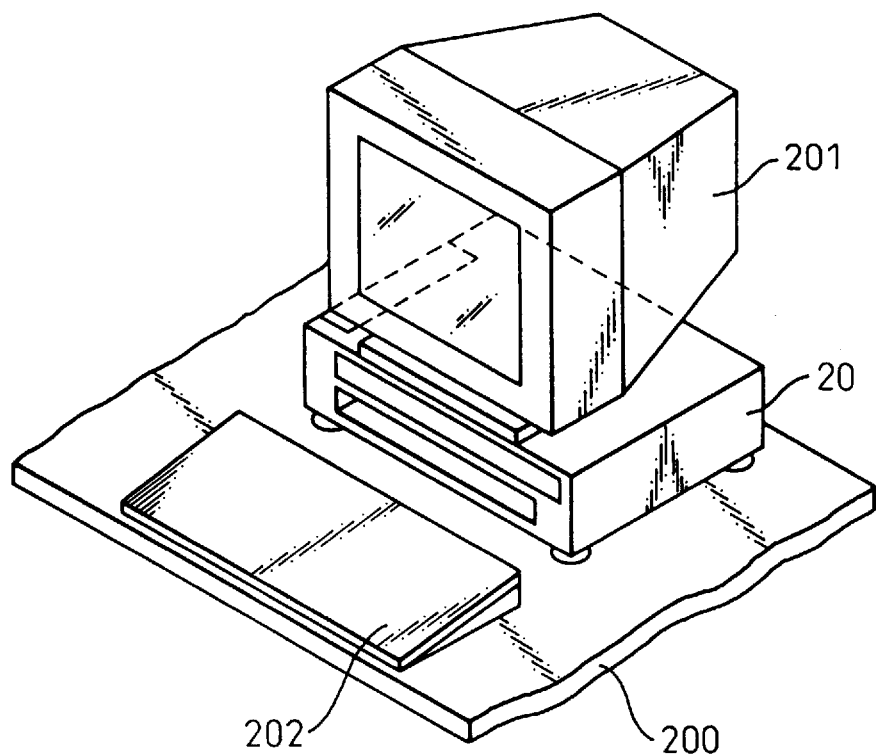
FIG. 13 is a perspective view of the image reading apparatus and the personal computer placed on the image reading apparatus.

The lower cavity 23 comprises a stacker into which the documents are successively conveyed and stacked, after they have been read. Hereinafter, the lower cavity 23 is called a stacker. Since the stacker 23 is provided in the lower portion of the apparatus and the stacker 23 is not pulled out, it is possible to place and use any less tall device such as a keyboard or the like in front of the casing 21. FIG. 13 shows an example of the use of the image reading apparatus 20 which is placed on a desk 200. A personal computer or the like 201 is put on the image reading apparatus 20, and a keyboard 202 is also placed in front of the image reading apparatus 20. In this way, space around the image reading apparatus 20 can be effectively utilized.

In FIGS. 5A and 5B, the image reading apparatus includes a pick roller 26 for feeding the documents set on the hopper 25 one by one, and a separator roller 27 for preventing a plurality of documents from being fed at a time. A separator pad (not shown) is arranged under the separator roller 27. The image reading apparatus also includes conveying rollers 28 to 32. A conveying path 33 is formed by these rollers 26 to 32, with a portion of the conveying path formed in the U-turn shape. Therefore, the sheets can be conveyed from the hopper 25 along the conveying path 33 to the stacker 23, when the sheet holder is not used. A side cover 34 is arranged on the side of the image reading apparatus, the inner curved surface of the side cover 34 forming the U-turn shape of the conveying path 33.

The image reading apparatus includes a reading head 36 arranged along the conveying path 33 for reading the documents, and the roller 29 acts as a platen. The reading head 36 is incorporated in a head unit 37 which is attached to the hopper table 24. The rollers 26 to 30, its driving mechanism (not shown), and the reading head 12 are carried by the hopper table 24, so that the reading head 36 and the rollers 26 to 30 are operable when the hopper table 24 is in the closed position and in the open position to read the sheets set on the hopper 25. The rollers 31 and 32 are mounted to the casing of the image reading apparatus and coupled to the rollers mounted to the hopper table 22 when the hopper table 22 is inserted in the cavity 22.

Side guides 38 are arranged on the hopper 25 in the hopper table 24. The side guides 38 are movable transversely on the hopper 25 in synchronism to guide the lateral sides of the sheets depending on the size of the sheets. A rack and pinion mechanism 39 (FIG. 9A) is arranged for this purpose. The side guides 38 have the guide panel 38b for engagement with the guide 5b of the sheet holder and the securing hole 38a for engagement with the securing finger 5a of the sheet holder, when the latter is attached to the image reading apparatus, as described above. The side guides 38 are movable transversely on the hopper 25 depending on the size of the sheet holder. Accordingly, the side guides 38 are used when the sheet holder is used or when the sheet holder is not used. The side guides 38 do not obstruct the operation of the apparatus when the sheet holder is not used.

Figure 6:
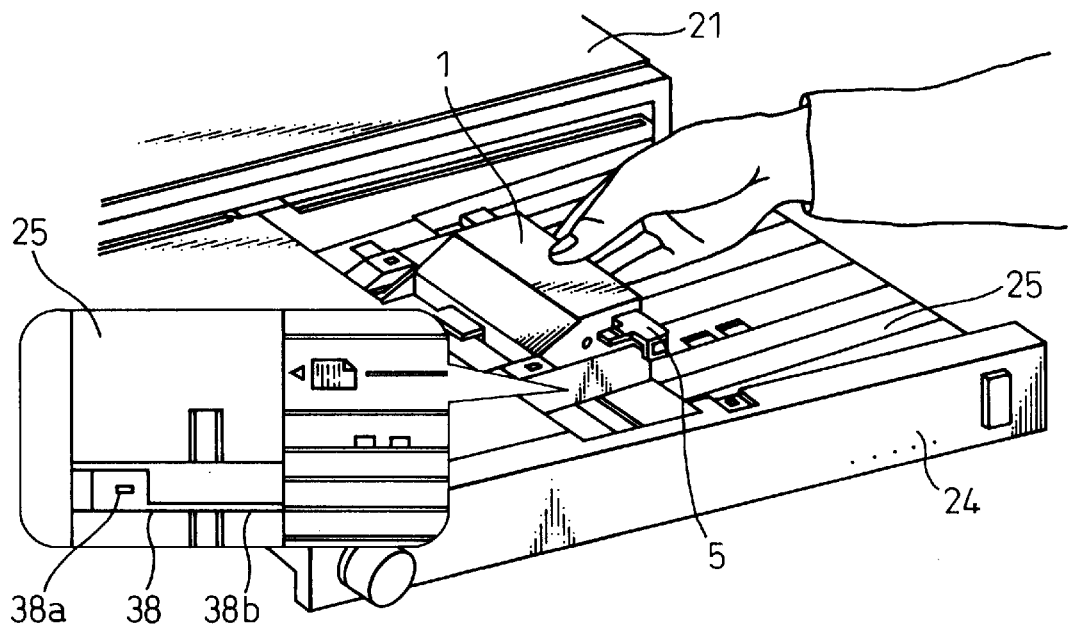
FIG. 6 is a perspective view of the image reading apparatus when the sheet holder is attached thereto.

FIG. 6 shows how to attach the sheet holder to the image reading apparatus. When the sheet holder is attached to the image reading apparatus, the side guides 38 are moved transversely on the hopper 25 depending on the width of the sheet holder. The guides 5b of the sheet holder are then engaged with the guide panels 38b. The sheet holder is then pushed forward until the securing fingers 5a are engaged in the securing holes 38a to fix the sheet holder to the image reading apparatus.

By sandwiching each of the guide panels 38b by two panels of each of the guides 5b, the guides 5b and the guide panels 38b act as guide means for setting the sheet holder in the accurate position in the image reading apparatus, and the attachment operation of the sheet holder can be facilitated. When the sheet holder is attached to the image reading apparatus after the sheets are placed onto the sheet holder, the sheet holder is carried by hand to operate the lever 4 and the clip 3 to hold the sheets, as shown in FIG. 6. Therefore, the sheets do not fall off the sheet holder even if the sheet holder is carried in the downward position.

Figure 7:
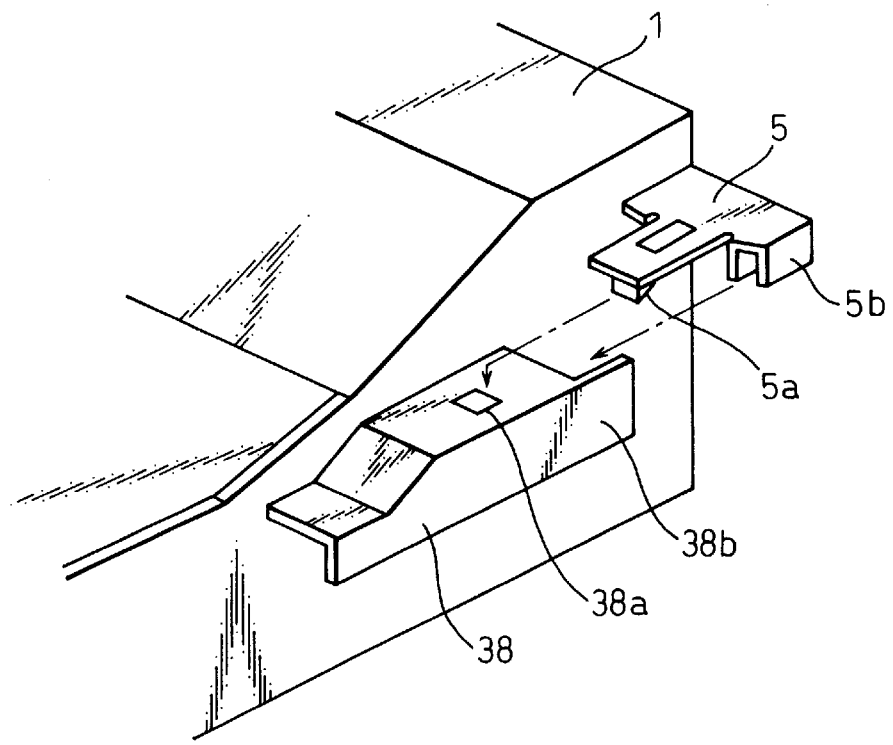
FIG. 7 is an enlarged view of the attachment portion of the sheet holder and the side guide of the image reading apparatus for attaching the former to the latter.

FIG. 7 is an enlarged view of the securing portion 5 and the side guides 38. The side guides 38 have the guide panel 38b in the form of a vertical side panel which can guide the sheet when the sheet holder is not used, and the securing hole 38a is provided in a horizontal top panel laterally extending from the guide panel 38b. When the sheet holder is attached to side guides 38, the securing fingers 5a of the sheet holder are engaged in the securing holes 38a and each of the guide panels 38b is sandwiched by two panels of each of the guides 5b. The guides 5b guide the sheet holder to move it in the direction by which the securing fingers 5a are engaged in the securing holes 38a, and the guides 5b are also used to bring the side guides 38 into an appropriate position at which the side guides 38 are located at an appropriate distance between them.

Figure 8A:
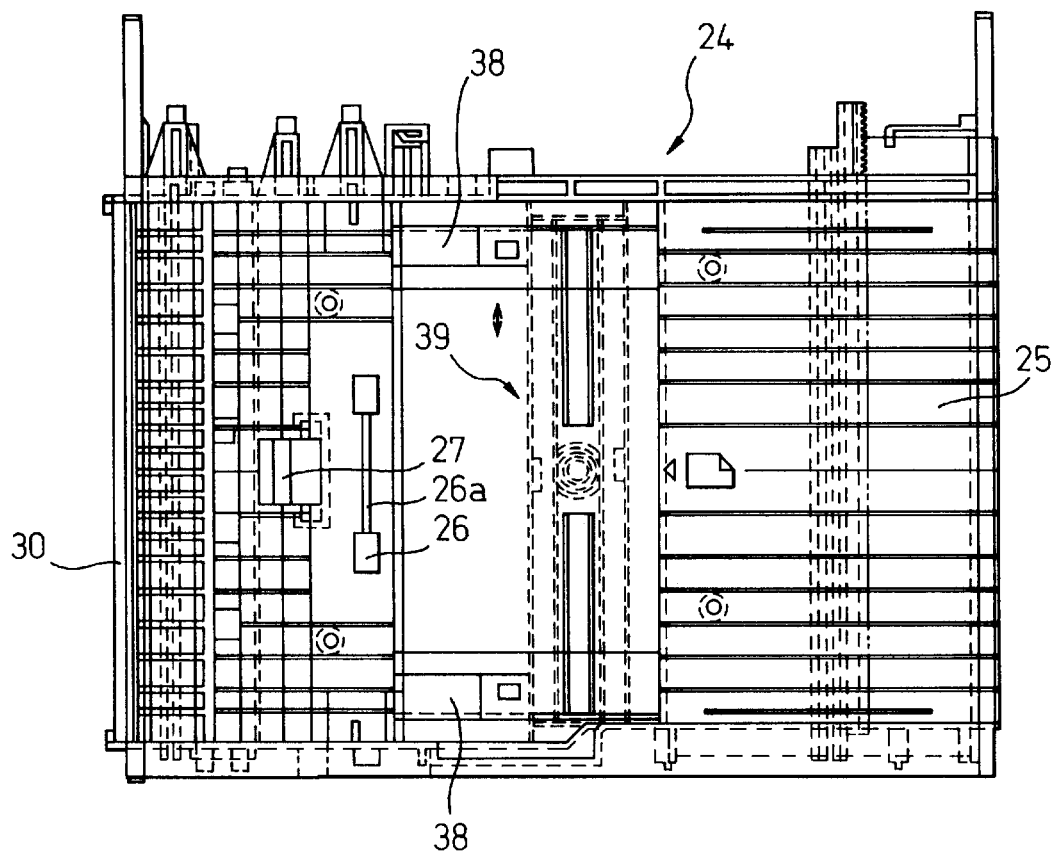
FIG. 8A is a plan view of the hopper table before the sheet holder is attached thereto.
Figure 8B:
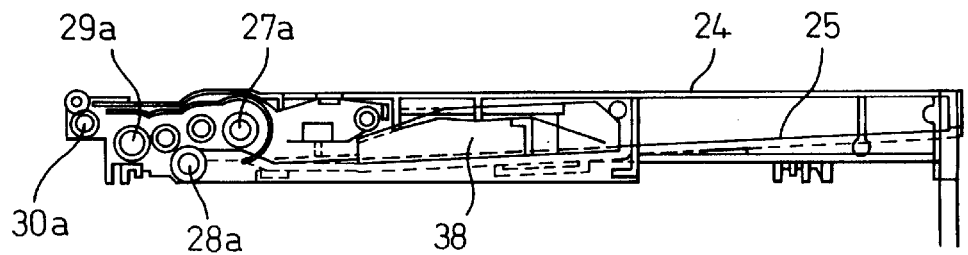
FIG. 8B is a side view of the hopper table of FIG. 8A.
Figure 9A:
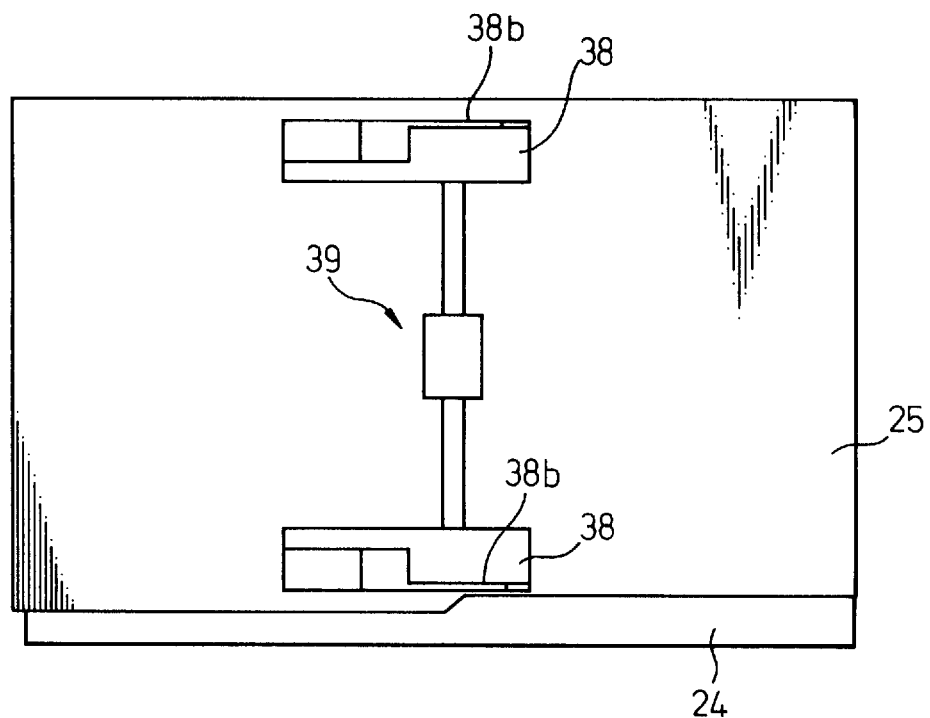
FIG. 9A is a plan view of the hopper table apparatus of FIG. 8A, with some elements extracted therefrom.
Figure 9B:
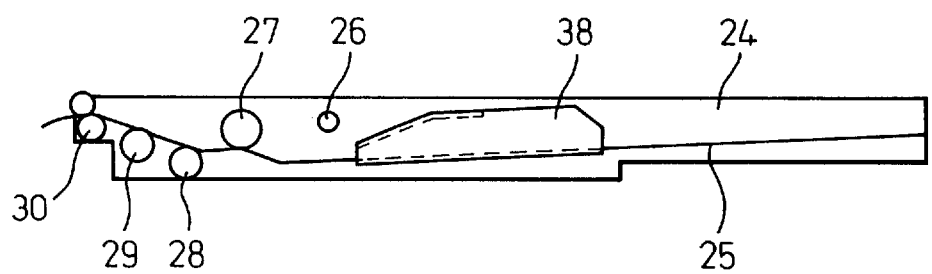
FIG. 9B is a side view of the hopper table of FIG. 9A.

FIGS. 8A to 9B show the hopper table 24 before the sheet holder is attached thereto. FIGS. 8A and 8B show the hopper table 24 in the detailed form and FIGS. 9A and 9B show the hopper table 24 in the simplified form with only some elements extracted from that of FIGS. 8A and 8B. The side guides 38 are particularly shown in FIGS. 9A and 9B. The side guides 38 are arranged on either side of the hopper 25 on which the sheets are to be set, as shown in these figures. When one of the side guides 38 is moved, the other side guide is also moved by the rack and pinion mechanism 39 so that the side guides 38 are set at appropriate positions depending on the size of the sheets. The rollers 26 to 30 are mounted to the hopper table 24, but the reading head 12 is omitted in these Figures.

Figure 10A:
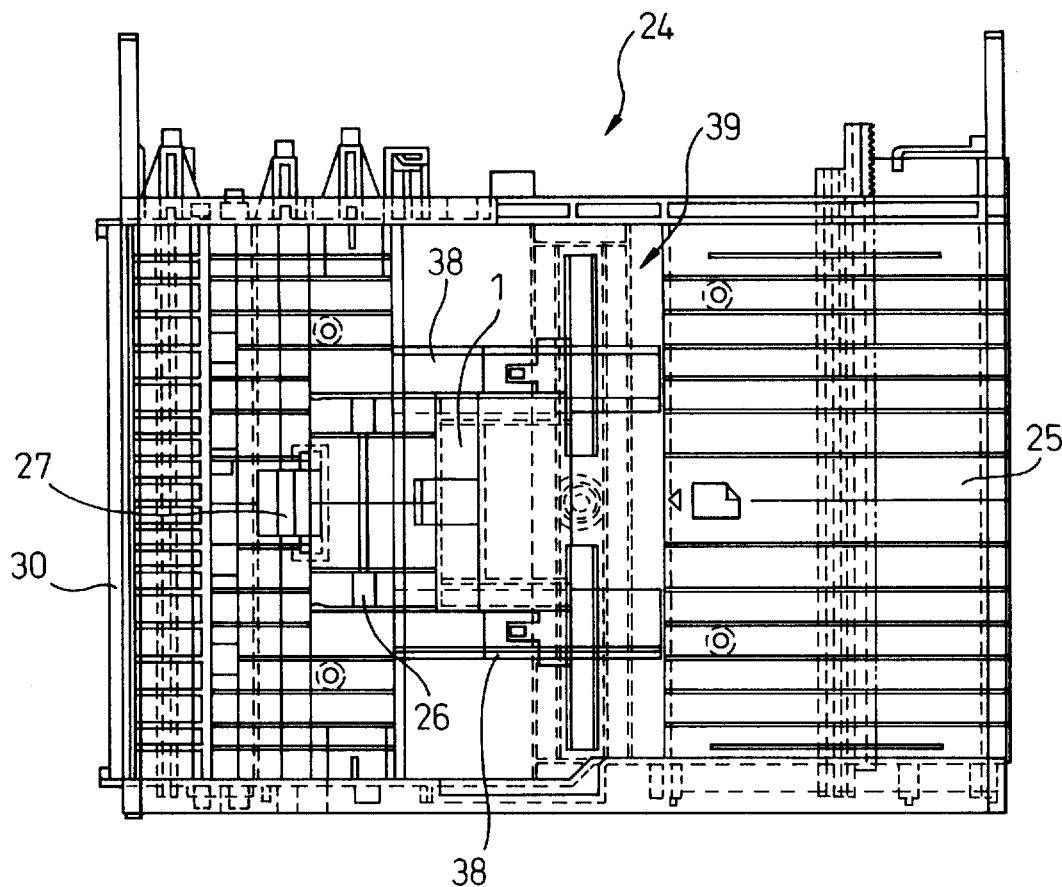
FIG. 10A is a plan view of the hopper table after the sheet holder is attached thereto.
Figure 10B:
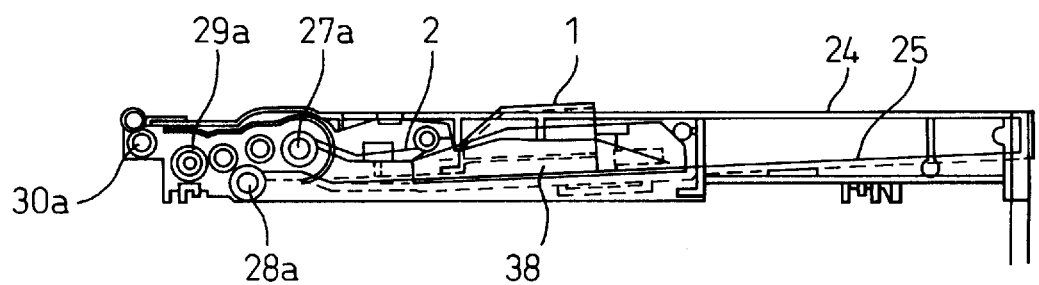
FIG. 10B is a side view of the hopper table of FIG. 10A.
Figure 11A:
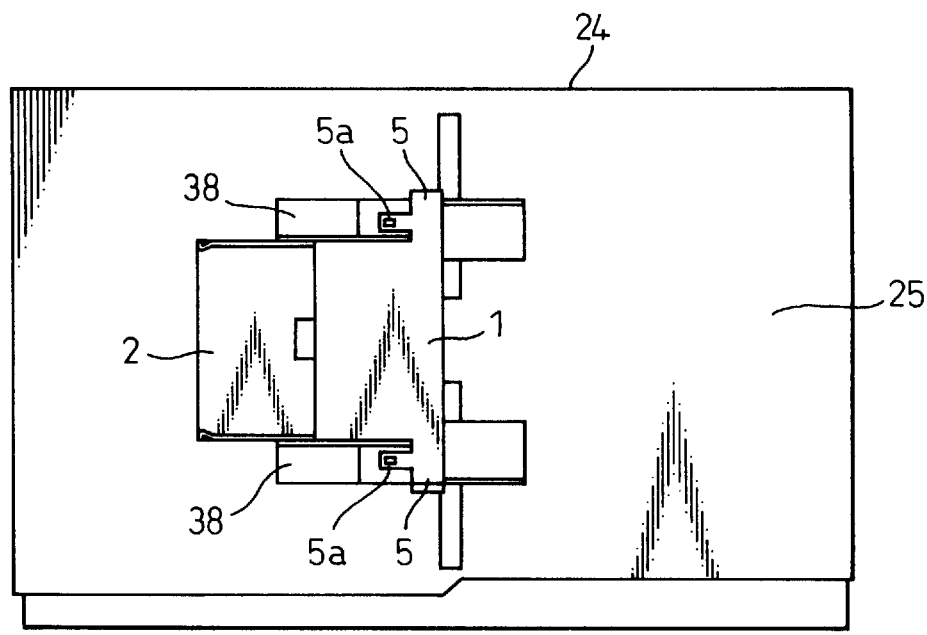
FIG. 11A is a plan view of the hopper table of FIG. 10A, with some elements extracted therefrom.
Figure 11B:
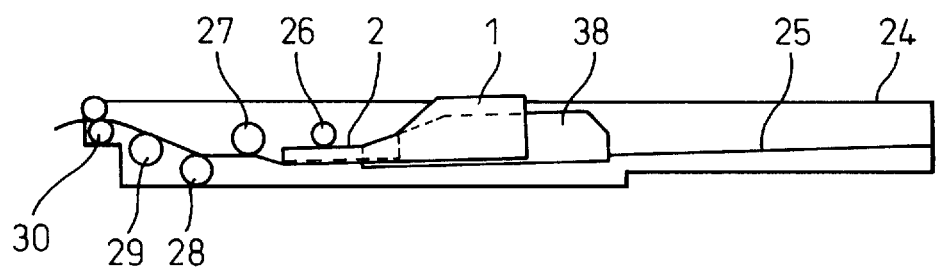
FIG. 11B is a side view of the hopper table of FIG. 11A.

FIGS. 10A to 11B show the hopper table 24 after the sheet holder is attached thereto. FIGS. 10A and 10B show the hopper table 24 in the detailed form and FIGS. 11A and 11B show the hopper table 24 in the simplified form with only some elements extracted from that of FIGS. 10A and 10B. The side guides 38 are moved on the inner side on the hopper 25 in accordance with the width of the sheet holder when the sheet holder is attached to the hopper table 24, as shown in these figures. Since two side guides 38 are moved in the identical way, it is possible to set the sheet holder in the center of the hopper table 24. The pick roller 26 and the separator roller 27 are arranged in the center of the hopper table 24, so the pick roller 26 is located on the center line of the sheets put on the sheet holder to thereby feed the sheets in the straight path, and so that the sheets are not inclined.

The pick roller 26 is located above the sheet placing portion 2 of the sheet holder, as shown in FIG. 11B. The pick roller 26 can move up and down as desired and the upper side of the sheet placing portion 2 is open, as described above, so that the pick roller 26 contacts the top sheet in the stack of the sheets on the sheet placing portion 2 to pick one sheet. Accordingly, the business cards can be conveyed, using the sheet holder.

The sheet is conveyed in this way and information of the sheet such as a business card is read by the reading head 36. The reading operation can be carried out in the closed position of the hopper table 24 or in the open position of the hopper table 24. The sheet holder has such a height that the hopper table 24 with the sheet holder attached thereto can be smoothly closed and opened in the casing of the image reading apparatus and the reading operation can be carried out with the hopper table 24 in the closed position without any inconvenience.

Figure 12A:
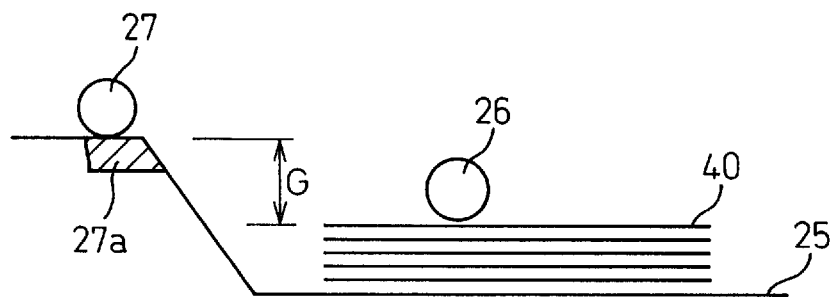
FIG. 12A is a diagrammatic side view of the image reading apparatus when the sheet holder is not used.
Figure 12B:
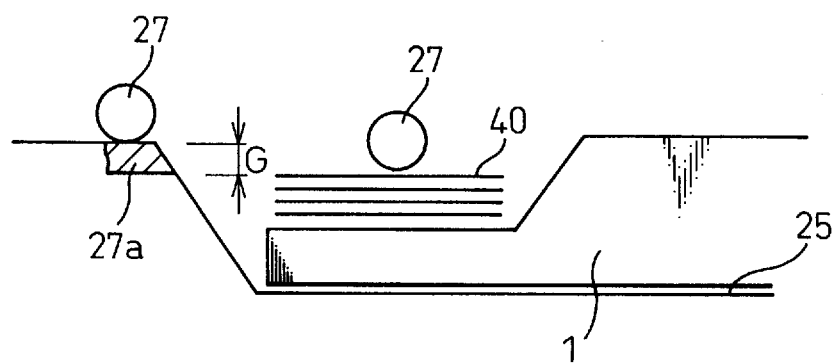
FIG. 12B is a diagrammatic side view of the image reading apparatus when the sheet holder is used.

FIG. 12A shows the image reading apparatus, in a very simplified form, when the sheet holder is not being used, and FIG. 12B shows the image reading apparatus when the sheet holder is being used. When the sheet holder is not used, the distance between the surface of the hopper 25 and the surface of the separator pad 27a (or the gap G between the top sheet of the stack of the sheets on the hopper 25 and the surface of the separator pad 27a) is relatively large, and in this case, the sheet separating action is strong but the sheet conveying action is weak. In the case of the usual thin sheets, the friction force between the sheets is weak and the sheet conveying action is strong. However, as it is difficult to easily separate the sheets from each other based on the frictional force, it is necessary to enhance the sheet separating action. This is established by the arrangement of FIG. 12A.

On the other hand, when the sheet holder is used, the distance between the surface of the hopper 25 and the surface of the separator pad 27a (or the gap G) becomes smaller by the thickness of the sheet placing portion 2, and in this case, the sheet separating action is weak but the sheet conveying action is strong. In the case of the small and thick sheets such as business cards, a large friction force acts on the sheet and the sheet can be easily separated from the next sheet, so that it is not necessary to provide a large sheet separating action. However, it is difficult to smoothly convey the thick sheets, especially to smoothly feed the thick sheets by the pick roller 26. Therefore, it is desired to improve the sheet conveying action. The use of the sheet holder is adapted for conveying thick sheet such as business cards.

As described in greater detail, according to the present invention, the sheet holder makes it possible to set the small and thick sheets such as business cards, which are difficult to directly set on the hopper, and to improve the sheet conveying action. Also, the clip can hold the sheets on the sheet placing portion of the sheet holder, and it is possible to easily attach the sheet holder to the image reading apparatus without the sheets falling off.

In addition, by attaching the sheet holder to the side guides arranged on the hopper to guide the sheets, it is not necessary to provide any special elements for attaching the sheet holder to the image reading apparatus. When the sheet holder is not used, the side guides can be normally used and the reading operation can be carried out without any inconvenience.

We claim:

1. A sheet holder for use with a data processing apparatus having a hopper and a pick roller, said sheet holder being adapted to be removably attached to said hopper of said data processing apparatus, said sheet holder comprising:

a body having a wall portion forming a sheet placing area arranged such that at least one sheet can be placed on said sheet placing area and said pick roller can contact said at least one sheet on said sheet placing area when said sheet holder is attached to said hopper;

securing means for cooperation with complementary securing means arranged in said hopper for fixing said sheet holder to said hopper; and a holding member for holding said at least one sheet on said sheet placing area, said holding member having a first end opposite to a second end, said holding member being pivotable about a pivot arranged between said first end and said second end so that said first end is manually operable and said second end can contact said at least one sheet on said sheet placing area.

2. The sheet holder according to claim 1, wherein said body comprises a front bottom wall, a rear top wall, and an intermediate wall connecting said front bottom wall to said rear top wall with a step between said front bottom wall and said rear top wall.

3. The sheet holder according to claim 2, wherein said holding member passing through said intermediate wall so that said first end is arranged below said rear top wall and said second end is arranged above said front bottom wall.

4. The sheet holder according to claim 3, wherein a portion of said holding member from said first end to said pivot is heavier than a portion of said holding member from said second end to said pivot.

5. The sheet holder according to claim 1, wherein said data processing apparatus has side guides arranged on said hopper for transverse movement on said hopper to guide said at least one sheet placed on said hopper, said securing means comprising a securing member for engagement with a complementary securing member provided in said side guides and a guide having a pair of panels for sandwiching a complementary panel of said side guides, said complementary securing means comprising said complementary securing member and said complementary panel.

6. The sheet holder according to claim 1, wherein said wall portion forming said sheet placing area has a surface and said hopper has a surface, said surface of said sheet placing area being higher than said surface of said hopper.

7. The sheet holder according to claim 1, wherein said hopper has a sheet placing areas such that said sheet placing area of said hopper is greater than said sheet placing area of said sheet holder.

8. The sheet holder according to claim 1, wherein a gap, between a top sheet of a stack of sheets on said hopper and a surface of a separator pad of a separator roller means for preventing a plurality of said sheets from being drawn at one time, is larger than a gap, between a top sheet of a stack of sheets on said sheet holder which has been placed on a sheet placing area of said hopper and said surface of said separator pad of said separator roller means for preventing a plurality of said sheets from being drawn at one time.

9. A data processing apparatus comprising:

a hopper;

a pick roller for feeding a sheet placed on said hopper;

side guides arranged on said hopper for transverse movement on said hopper to guide said sheet placed on said hopper;

a first member removably attached to said hopper;

a first securing means arranged in said first member; and a second securing means arranged in at least one of said side guides for engaging with said first securing means to removably fix said first member to said hopper.

10. The data processing apparatus according to claim 9, wherein said first member comprises a sheet holder, said sheet holder comprising:

a body having a wall portion forming a sheet placing area arranged such that at least one sheet can be placed on said sheet placing area and said pick roller can contact said at least one sheet on said sheet placing area when said sheet holder is attached to said hopper; and a holding member for holding said at least one sheet on said sheet placing area, said holding member having a first end opposite to a second end, said holding member being pivotable about a pivot arranged between said first end and said second end so that said first end is manually operable and said second end can contact said at least one sheet on said sheet placing area.

11. The data processing apparatus according to claim 10, wherein said body comprises a front bottom wall, a rear top wall, and an intermediate wall connecting said front bottom wall to said rear top wall with a step between said front bottom wall and said rear top wall, said holding member passing through said intermediate wall so that said first end is arranged below said rear top wall and said second end is arranged above said front bottom wall.

12. The data processing apparatus according to claim 11, wherein said first securing means comprises a securing member and a guide having a pair of panels, said second securing means comprising a securing hole for engagement with said securing member and a panel sandwiched by said pair of panels of said first member.

13. The data processing apparatus according to claim 12, wherein said side guides each comprise a vertical wall providing said panel sandwiched by said pair of panels of said first member and a horizontal wall connected to said vertical wall, said securing hole being provided in said horizontal wall.

14. A data processing apparatus comprising:

a casing having a first cavity and a second cavity arranged in a vertically spaced relationship;

a hopper table drawably arranged in said first cavity, said hopper table having a hopper for placing sheets thereon;

said second cavity being a place where said sheets can be stacked;

data processing means arranged in said hopper table;

a pick roller for feeding a sheet on said hopper;

a separator roller attached to a separator roller shaft;

side guides arranged on said hopper for transverse movement on said hopper to guide said sheet placed on said hopper;

a sheet holder removably attached to said hopper, said sheet holder comprising a body having a wall portion forming a sheet placing, area arranged such that at least one sheet can be placed on said sheet placing area and said pick roller can contact said at least one sheet on said sheet placing area when said sheet holder is attached to said hopper, and a holding member for holding said at least one sheet on said sheet placing area, said holding member having a first end opposite to a second end, said holding member being pivotable about a pivot arranged between said first end and said second end so that said first end is manually operable and said second end can contact said at least one sheet on said sheet placing area;

a first securing means arranged in said sheet holder; and a second securing means arranged in at least one of said side guides for engaging with said first securing means to removably fix said sheet holder to said hopper.

15. The data processing apparatus according to claim 14, wherein said body comprises a front bottom wall, a rear top wall, and an intermediate wall connecting said front bottom wall to said rear top wall with a step between said front bottom wall and said rear top wall, said holding member passing through said intermediate wall so that said first end is arranged below said rear top wall and said second end is arranged above said front bottom wall.

16. The data processing apparatus according to claim 15, wherein said first securing means comprises a securing member and a guide having a pair of panels, said second securing means comprising a securing hole for engagement with said securing member and a panel sandwiched by said pair of panels of said first member.

17. The data processing apparatus according to claim 16, wherein said side guides each comprise a vertical wall providing said panel sandwiched by said pair of panels of said first member and a horizontal wall connected to said vertical wall, said securing hole being provided in said horizontal wall.

18. The data processing apparatus according to claim 17, wherein said first securing means is arranged so that said securing member is located in front of said guide in view of a sheet conveying direction defined by said pick roller and said separator roller.

19. The data processing apparatus according to claim 18, wherein a leading part of said pair of panels of said guide diverges to facilitate insertion of said pair of panels of said guide onto said panel of said second securing means.

20. A data processing apparatus comprising:

a hopper;

a pick roller;

a sheet holder being adapted to be removably attached to said hopper of said data processing apparatus, said sheet holder comprising:

a body having a wall portion forming a sheet placing area arranged such that at least one sheet can be placed on said sheet placing area and said pick roller can contact said at least one sheet on said sheet placing area when said sheet holder is attached to said hopper; and securing means for cooperation with complementary securing means arranged in said hopper for fixing said sheet holder to said hopper; and side guides arranged on said hopper for transverse movement on said hopper to guide said at least one sheet placed on said hopper, said securing means comprising a securing member for engagement with a complemental securing member provided in said side guides and a guide having a pair of panels for sandwiching a complementary panel of said side guides, said complementary securing means comprising said complementary securing member and said complementary panel.

* * * * *